UNITED STATES PATENT OFFICE.

FRANK L. BARROWS, OF MOSCOW, IDAHO.

PROCESS OF MOUNTING EYE SPECIMENS.

1,086,265.  Specification of Letters Patent.  Patented Feb. 3, 1914.

No Drawing.  Application filed May 26, 1913.  Serial No. 770,093.

*To all whom it may concern:*

Be it known that I, FRANK L. BARROWS, a citizen of the United States, residing at Moscow, in the county of Latah, State of Idaho, have invented an Improvement in Processes of Mounting Eye Specimens.

My object is to mount and preserve eye specimens in such a way that they will hold their normal shape and natural appearance.

How I attain my object will be readily understood from a perusal of the following description:

I take fresh eyes from some animated being (preferably pig or sheep) and suspend them in a four per cent. formalin solution, in such a manner that the corneas do not touch each other or the bottom of the vessel where contained. The eyes may be suspended by assistance of a thread attached to the optic nerve or any other way. The eyes are left in this solution until fixed and hardened, when they are frozen and cut in half, cutting through the center of the optic nerve, lens and cornea. The next step is to take the halves and place them in a hot gelatin solution composed of French gelatin one ounce, gylcerin, eight ounces, water eight ounces, formalin thirty minims. The halves are left in this hot solution until the gelatin has dissolved out the vitreous body, filling the cavity, as well as that of the interior chamber, with gelatin after which the gelatin is allowed to solidify. The half eyes are then taken out of the gelatin without disturbing that part within the cavity of the eye, and the eye is carefully placed in the center of a glass cup filled with soft gelatin. They are left in this position until the surrounding gelatin has solidified after which the cups are sealed and mounted in bases.

What I claim is:

1. The described process of preparing an eye specimen for mounting, consisting in placing it in a formalin solution to harden the same, then freezing it and dividing it into two parts; keeping such parts immersed in an aqueous solution of gelatin, glycerin, and formalin, until the vitreous portion has dissolved out and gelatin has taken its place; then removing the eye portions and immersing them in soft gelatin, which is allowed to solidify, as described.

2. The described process of mounting eye specimens, consisting in placing a natural eye in a 4% formalin solution, and keeping it immersed therein until hardened; then freezing the specimen and dividing it into two parts, and keeping the latter immersed in a solution of gelatin, one ounce, glycerin, eight ounces, and formalin thirty minims, in eight ounces of water, until the vitreous portion has dissolved out and gelatin has taken its place; then removing the specimens and immersing them in soft gelatin, which is allowed to solidify; and then sealing the specimens in suitable receptacles, as described.

FRANK L. BARROWS. [L. S.]

Witnesses:
 L. G. PETERSON,
 JOHN NISBET.

Copies of this patent may be obtained for five cents each, by addressing the "Commissioner of Patents, Washington, D. C."